United States Patent [19]

Frischmuth et al.

[11] 4,147,593
[45] Apr. 3, 1979

[54] FLASH PYROLYSIS OF ORGANIC SOLID WASTE EMPLOYING ASH RECYCLE

[75] Inventors: Robert W. Frischmuth, Huntington Beach; Allan Sass, Los Angeles, both of Calif.

[73] Assignee: Occidental Petroleum Corporation, Los Angeles, Calif.

[21] Appl. No.: 776,234

[22] Filed: Mar. 10, 1977

Related U.S. Application Data

[63] Continuation-in-part of Ser. No. 707,441, Jul. 21, 1976, abandoned, which is a continuation-in-part of Ser. No. 603,875, Aug. 11, 1975, abandoned.

[51] Int. Cl.² .................... C10B 49/16; C10B 53/02
[52] U.S. Cl. ........................................ 201/21; 48/209; 106/281 R; 201/2.5; 201/12; 201/22; 201/25; 201/28; 201/33; 201/42; 202/99
[58] Field of Search ............... 201/2.5, 3, 4, 7, 8, 201/10, 12, 13, 14, 15, 16, 20, 21, 25, 28, 29, 30, 31, 32, 33, 37, 42; 202/96, 99; 48/111, 209

[56] References Cited

U.S. PATENT DOCUMENTS

| | | | |
|---|---|---|---|
| 3,251,751 | 5/1966 | Lindahl et al. | 201/12 |
| 3,444,048 | 5/1969 | Schmeling et al. | 209/3 X |
| 3,574,065 | 4/1971 | Eddinger et al. | 201/12 |
| 3,655,518 | 4/1972 | Schmalfeld et al. | 201/12 X |
| 3,698,882 | 10/1972 | Garrett et al. | 48/209 UX |
| 3,736,111 | 5/1973 | Gardner et al. | 201/25 X |
| 3,846,096 | 11/1974 | Mallan et al. | 48/209 |
| 3,853,498 | 12/1974 | Bailie | 201/12 |

FOREIGN PATENT DOCUMENTS 1398858 6/1975 United Kingdom.

Primary Examiner—Joseph Scovronek
Attorney, Agent, or Firm—Christie, Parker & Hale

[57] ABSTRACT

Essentially carbon free inorganic particles formed from the decarbonization of a carbon containing solid residue of pyrolysis of comminuted organic solid waste is employed as the prime heat source for the pyrolysis of the comminuted organic solid waste.

23 Claims, 6 Drawing Figures

FLASH PYROLYSIS OF ORGANIC SOLID WASTE EMPLOYING ASH RECYCLE

CROSS REFERENCE TO RELATED APPLICATION

This is a continuation-in-part of our application Ser. No. 707,441 filed July 21, 1976, now abandoned, which is a continuation in part of our application Ser. No. 603,875 filed Aug. 11, 1975, now abandoned.

BACKGROUND OF THE INVENTION

The present invention is directed to the pyrolysis of organic solid wastes from industrial and municipal sources.

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill, are becoming impossible, while others such as incineration are costly and result in air pollution problems.

A vast majority of the waste which is presently disposed of contains products which are immediately recyclable back into the economy or products into which the waste can be converted for recycle back to the economy. Directly recyclable constituents are the various metals present, such as aluminum, steel and glass. For the most part, the organic solid waste fraction may be subject to a flash pyrolysis as an operation independent of recovery of the directly recyclable inorganic fraction and any organic portion recovered as pulp. Flash pyrolysis yields char, pyrolytic oil and gases as products.

SUMMARY OF THE INVENTION

It has now been found that select size fractions of the essentially carbon free particulate inorganic residue formed from decarbonization of the carbon containing solid residue from the pyrolysis of organic waste which includes fine inorganics, particularly glass and metals which elude gross recovery of inorganic values, represents a material improvement over the carbon containing solid residue of pyrolysis as the source of heat for flash pyrolysis. Relatively attrition free, it has excellent fluidization characteristics for transport to a pyrolysis reactor and is of high bulk density. This latter property reduces significantly the height of fluidized legs, improving materially the feasibility of flash pyrolysis operations which depend on their use.

In the flash pyrolysis process of the invention, therefore, particulate solid organic waste, which includes carbonaceous matter and existing as a substantially inseparable, essentially homogeneous mixture of combustibles and ash forming minerals and fillers and separate particulate inorganic constituents, is combined with a particulate, essentially inorganic solid heat source resulting from decarbonization of the carbon containing solid residue of pyrolysis and a carrier gas which is nondeleteriously reactive with respect to the pyrolysis products, and transported under turbulent flow conditions through a pyrolysis zone maintained at a temperature from about 600° F. to below the sintering temperature of the inorganic solid heat source, preferably from about 600° to about 1700° F., more preferably from 800° to 1400° F. to form pyrolysis products which comprise the carbon containing solid residue of pyrolysis, a condensable pyrolytic oil and a gaseous by-product. The carbon containing solid residue of pyrolysis which includes the inorganics present in the waste in admixture with the inorganic solid heat source and are separated from the gasified pyrolytic oil and gaseous component, and passed through a decarbonization zone where the carbon containing solid residue of pyrolysis is decarbonized to yield the inorganic solid heat source for recycle back to the pyrolysis zone.

In the pyrolysis process of this invention, the solid organic waste, including entrained inorganics, exists as discrete particles having a maximum particle dimension less than one inch, and are preferably of a size less than about 5 mesh. For ease of mass transport and transfer of heat to the organic solid waste undergoing pyrolysis, the inorganic solid heat source is generally of a particle size in the range of from about 10 to about 2,000 microns, preferably from about 20 to about 1000 microns and has a bulk density from about 35 to about 70 lbs./cu. ft. Preferably, at least 50% of the particles are greater than 37 microns. Although any carrier gas which is nondeleteriously reactive, i.e., essentially oxygen free with respect to the products of pyrolysis may be used as a transport gas for both the organic solid waste and the hot inorganic solid heat source, it is preferred for expediency in the process to use the gases which are the by-products of the pyrolysis operation itself. The principal constituents of the by-product gas are the oxides of carbon. Residence time during flash pyrolysis is generally less than 10 seconds, preferably from 0.1 to 2 seconds, and more preferably, from about 0.1 to 1 second. The weight ratio of inorganic solid heat source to organic solid waste fed to the pyrolysis zone will vary depending upon temperature of the heat source and the temperature desired in the pyrolysis zone. Generally, about 2 to about 20 pounds, preferably from 4 to 6 pounds of inorganic solid heat source per pound of the comminuted organic solid waste is fed to the pyrolysis zone.

Pyrolysis results from heating of the solid waste primarily by solids to solids heat transfer with some solids to gas to solids heat transfer occurring. To achieve this end, turbulent flow conditions are required. Reynolds flow index numbers will, therefore, exceed 2,000 with Reynolds numbers in excess of 50,000 frequently employed.

Following pyrolysis, the particulate heavier inorganic solid heat source and carbon containing solid residue of pyrolysis are separated from the resultant high temperature stream, leaving fine carbon containing particles, the condensable pyrolytic oils, and the pyrolysis gases as a separate stream. After separation of the fine carbon containing particles, the pyrolytic oils are condensed, preferably using an oil quench, and the gas to the extent required, recycled as a carrier transport gas for use in the process. The excess gas may be used as drying gas as well as a fuel source.

The mixture of inorganic solid heat source and carbon containing solid residue of pyrolysis which is recovered from the pyrolysis zone is subject to decarbonization, preferably by controlled combustion in the presence of a source of oxygen, normally air, and water.

Water aids in decarbonization and moderates the combustion temperature to maintain the temperature below the temperature at which fusion of the inorganic particles will occur. For the particulate inorganics entrained in a typical organic solid waste, fusion temperature will generally be about 1425° F. to 1700° F. It is preferred to conduct decarbonization at a controlled temperature below the sintering temperature to avoid agglomeration of the particles. After decarbonization, the formed inorganic solid heat source is processed to selectively recover particles of larger size, e.g. 10 microns or more for recycle, as required to the pyrolysis zone. The fines are recovered as a product. Because of its glass-like nature, the excess inorganic solid heat source may be used as an asphalt filler for road paving operations, and therefore has an immediate value in the municipality processing of the solid waste, as part of an ongoing operation.

Particular benefits of converting the carbon containing solid residue of pyrolysis to the inorganic solid heat source, however, are found in the savings in equipment size used to transport the inorganic solid heat source during the transport, flash pyrolysis operation. The carbon containing solid residue formed from organic waste results as a consequence of approximately a 50% reduction in the particle size of the waste. In forming the inorganic solid heat source, however, there is a significant increase in bulk density ranging from 400 to 900%. The inorganic solid heat source having, as indicated, a settled bulk density of between about 55 and about 70 pounds per cubic foot is of a particle size which enables fluidization without channeling or slugging with a material reduction of standpipe or fluidized leg height required to meet the pressure differentials within the process. In addition, it is relatively stable and insensitive to attrition behaving superior to catalysts normally employed in catalytic cracking.

In addition, by converting the carbon containing solid residue of pyrolysis to the inorganic solid heat source, a better overall heat balance is realized for the system. When the carbon containing solid residue is used as a heat source, and the heat is generated by limited combustion in air, the feed to a burner employed must be oxygen lean. This generates considerable quantities of carbon monoxide with a generally low heat release. By total decarbonization, combustion may occur in a stoichiometric excess of air, maximizing the amount of heat generated for return in the inorganic solid heat source to the pyrolysis reactor. These several advantages are not present in the use of the carbon containing solid residue of pyrolysis as the heat source for pyrolysis.

DESCRIPTION

Figure 1:
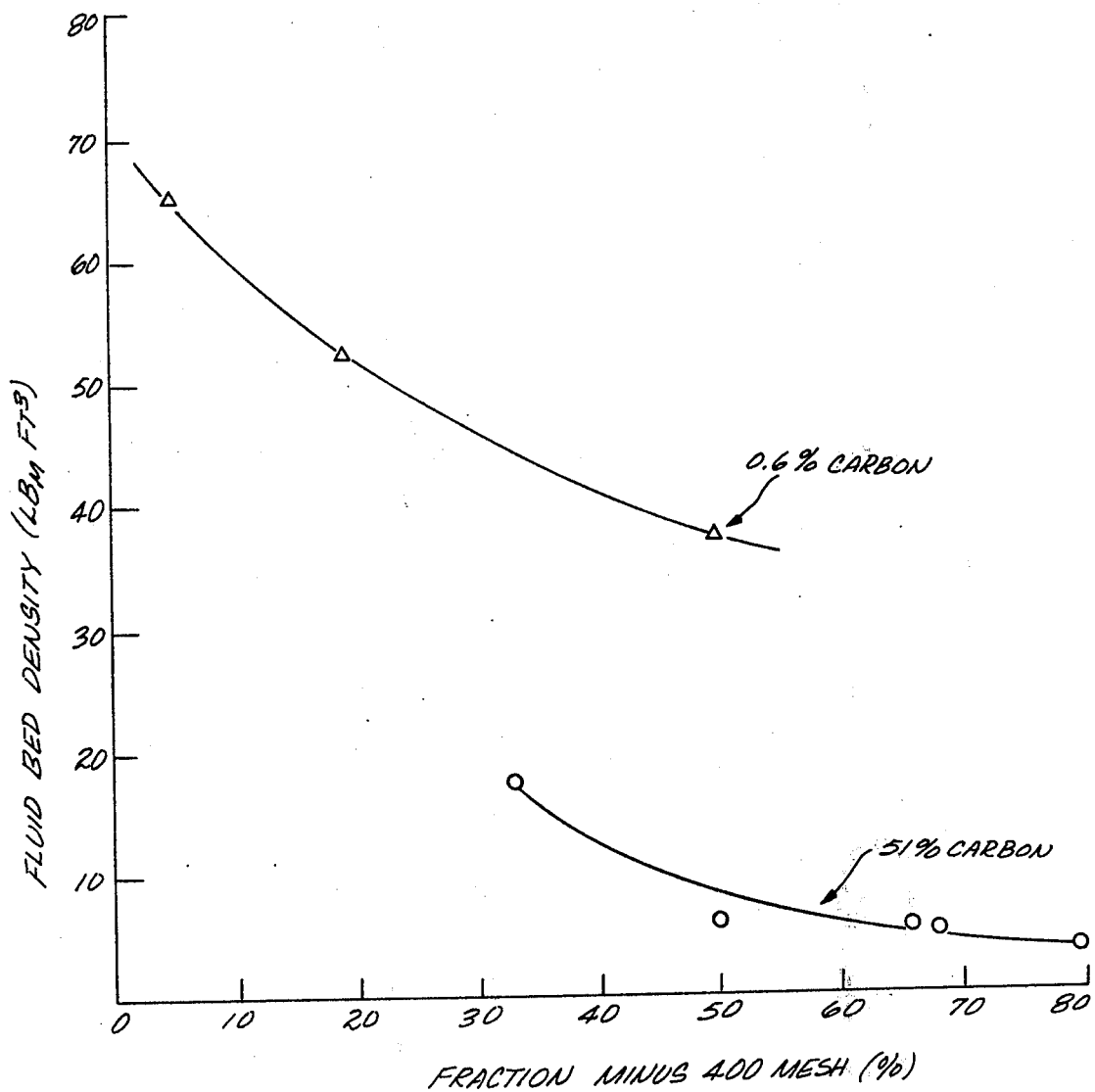
FIG. 1 shows a comparison of the fluidized bed density of the carbon containing solid residue of pyrolysis as compared to the formed inorganic solid heat source.

In accordance with the present invention, a particulate solid heat source or "ash" formed by decarbonization of the carbon containing solid residue of pyrolysis of organic solid waste is employed as a prime source of heat in the pyrolysis of the comminuted organic solid waste.

As used herein, the term "organic solid wastes" is meant the predominately organic portion derived from as received waste source, domestic and/or industrial in orgin, after gross separation of an inorganic constituent such as iron, aluminum, glass and other values including paper pulp from the waste. Because of the several comminuting operations attendant to the gross separation, there appear in the organic solid waste fraction fine particles of glass and other inorganic constituents which make up at least 1%, usually about 3% and normally from about 5 to 8% by weight (dry basis) of the organic solid waste. Organic solid wastes containing much larger amounts of glass and other inorganics may be treated by the process of the invention, the limitation upon the content of such materials being dependent upon the maximum heat capacity and density of the solid waste acceptable to the pyrolysis system. Because these inorganics, except for some of the fine natural ash content of organic matter, following decarbonization of the solid effluent of the pyrolysis zone, become the solid particulate heat source used for pyrolysis, the amount of such inorganics in the solid waste may be adjusted to cause the production of a desired amount of the solid particulate heat source. For instance, the inorganic content of the solid waste may be adjusted upwardly by addition of materials such as glass, ceramics, refractories, natural or artificial siliceous or aluminiferrous materials and metals to the solid waste. Conversely, organic matter can be added to reduce the percentage inorganic content of the waste.

The organic constituents of the organic solid wastes include cellulosic materials, plastic, rubber stock, and animal waste. Included in the meaning of "cellulosic materials" are paper, tree trimming and bark, sawdust, crop waste, vegetable and fruit processing waste, and the like. "Plastics" include discarded household plastics, as well as the waste of industrial polymer forming and processing operations. "Rubber stock" includes waste tires. "Animal wastes" include household discards, slaughter house wastes, poultry processing wastes, manure, and the like.

Resulting from a generally sundry mixture of waste materials after gross separation of inorganic values, the organic solid waste may have, after drying to the extent required for transport to a pyrolysis reactor, the following typical analysis:

Table 1

| Constituent | % by Weight |
| --- | --- |
| Organics | 92.29 |
| Metals | 0.38 |
| Glass | 1.69 |
| Other Inorganics | 2.02 |
| Water | 3.62 |

When the organic solid waste is pyrolyzed there is formed a mixture of solid carbon containing residue of pyrolysis which includes the entrained inorganics, pyrolytic oils and gas. The gas includes transport gas and gases resulting from pyrolysis. The gas on a dry basis consists primarily of the oxides of carbon and hydrogen.

The carbon containing solid residue of pyrolysis, which may be termed "char", contains from about 10 to about 60% inorganics, usually no more than about 50% inorganics, the balance being carbonaceous in nature, the major constituent of which is carbon. If the carbon-containing solid residue contains less than 60% inorganics, its inorganic content may be increased by adding inorganic materials, for instance ceramics, refractories or metals, to the said solid residue before its decarbonization to produce the solid particulate heat source.

Figure 4:
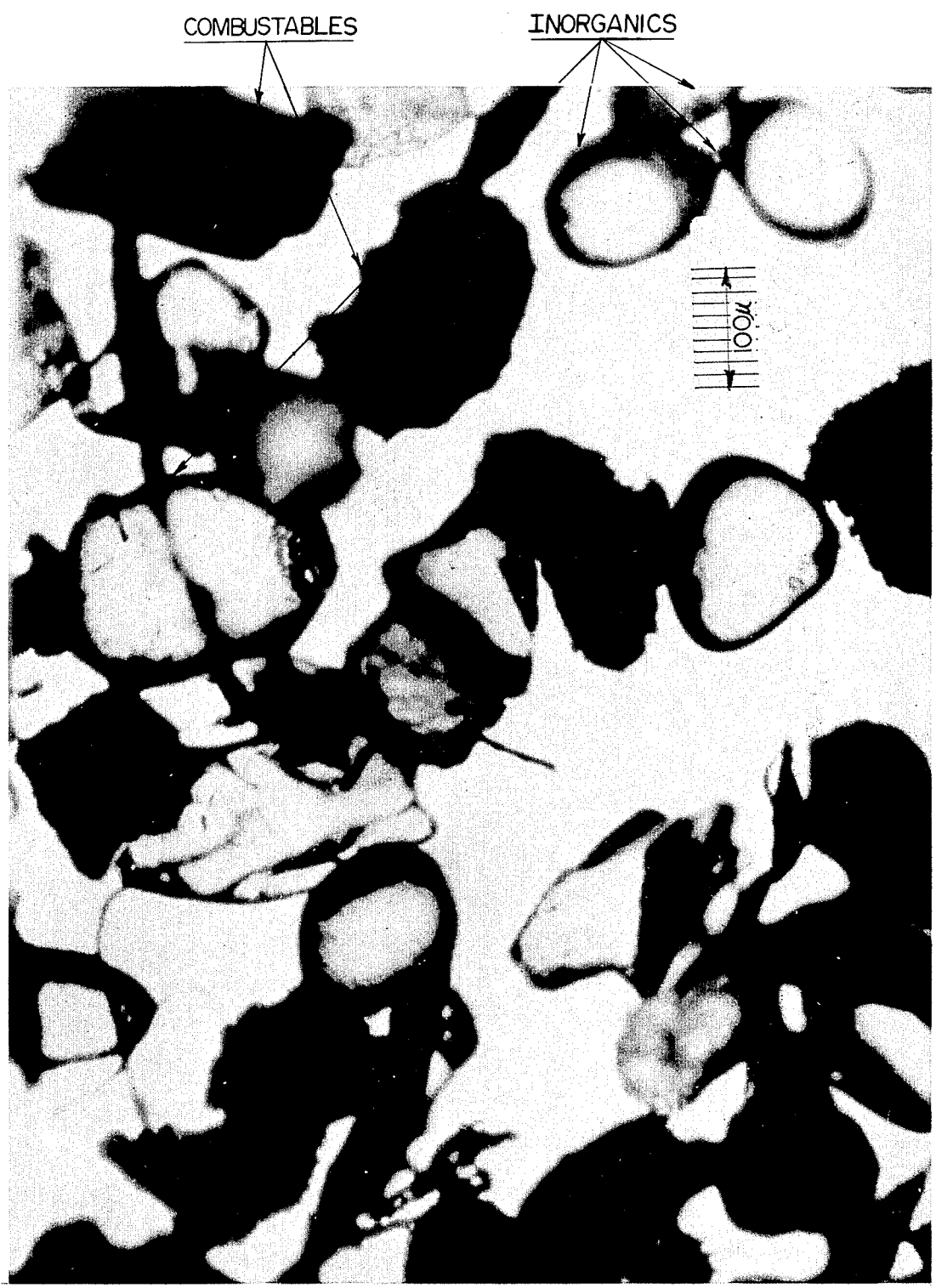
FIG. 4 is a 60X microphotograph of particles resulting from pyrolysis of solid organic waste and which are greater than 150 mesh and less than 100 mesh showing the combustable particles and the inorganic particles.
Figure 5:
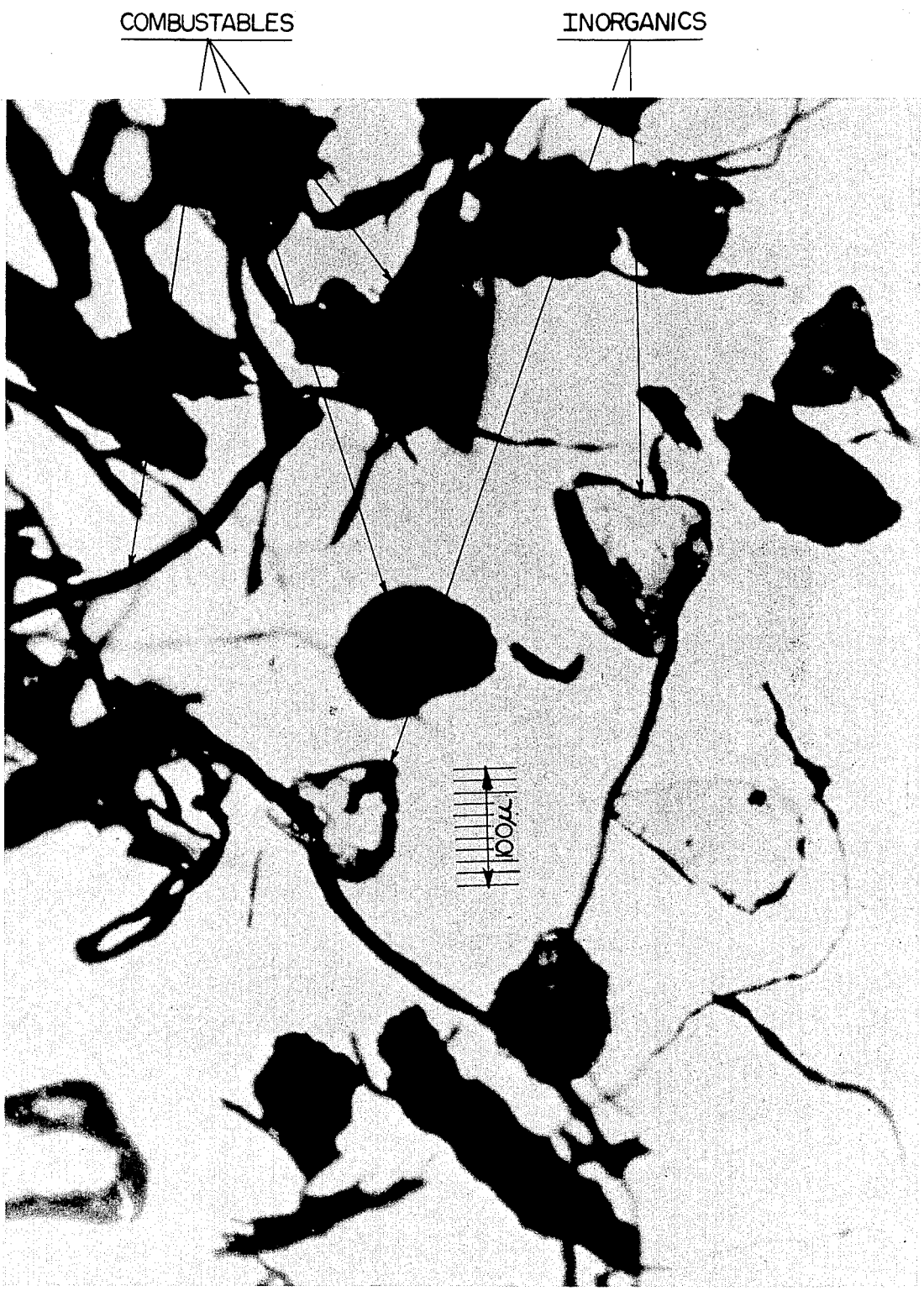
FIG. 5 is a 60X microphotograph of particles resulting from pyrolysis of solid organic waste and which are finer than 150 mesh, but larger than 200 mesh showing combustable particles and inorganic particles.
Figure 6:
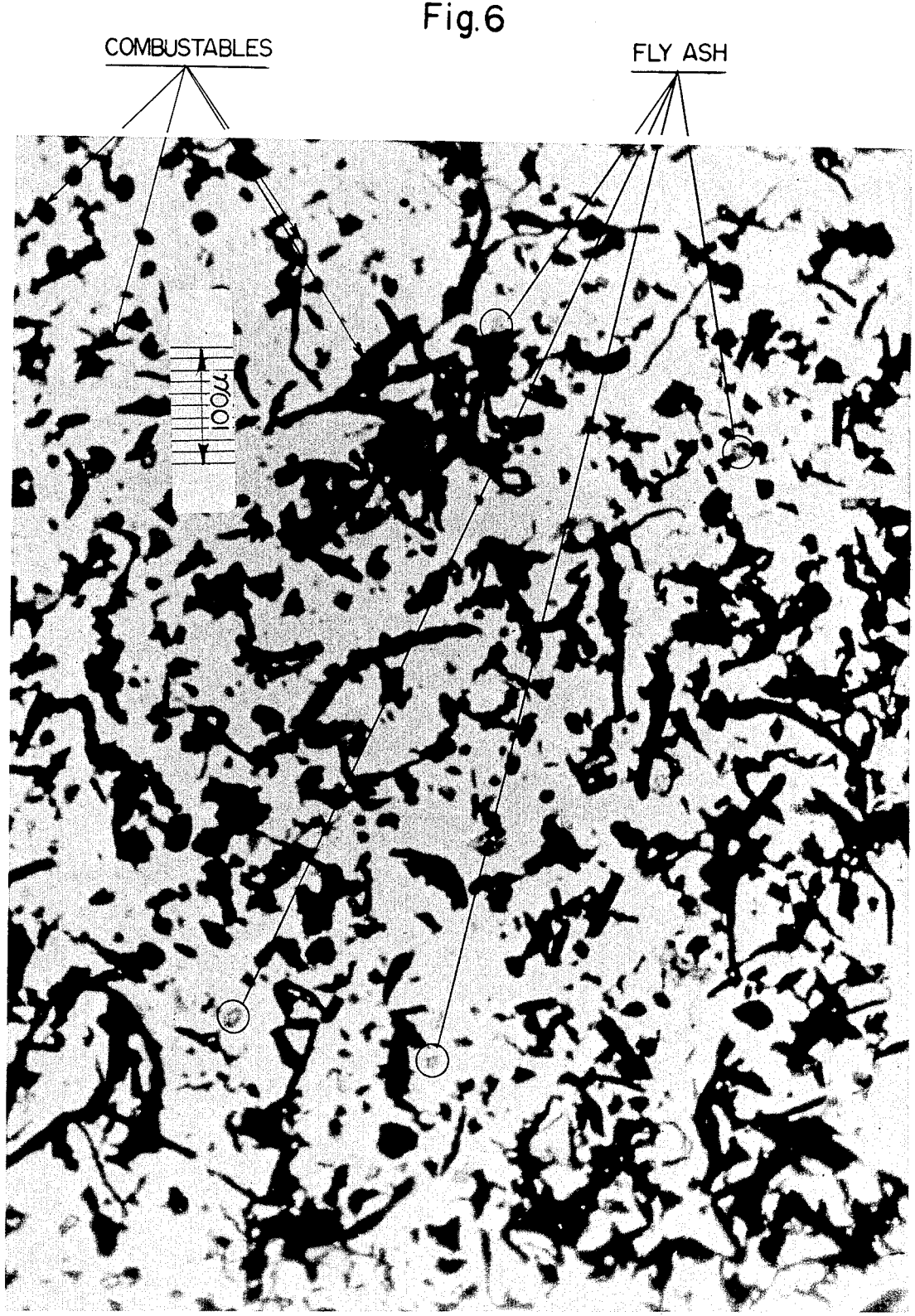
FIG. 6 is a 60X microphotograph of particles resulting from pyrolysis of solid organic waste and which are finer than 400 mesh showing combustable particles and fly ash.

Attached FIGS. 4, 5 and 6, illustrate the nature of the carbon containing solid residue of pyrolysis. It contains combustables which are carbonaceous in nature, i.e. contain carbon, hydrogen and oxygen, and is of low bulk density. Low bulk density is especially attributed to the fiberous particles shown in FIG. 5 which resist compression. There is also present inorganics, mainly glass and metal particles, which exist predominately a separate discrete particle which may contain some entrained carbon. The fines, 400 mesh or less (see FIG. 6), include fine organics (combustibles), the fine inorganics present in the feed plus the naturally occurring ash of the organic matter subject to pyrolysis. The inorganic fines are termed herein "fly ash". Despite high inorganics content, bulk density is only about 3.5 to about 12.5 lbs./cu. ft.

When the carbon containing solid residue of pyrolysis is decarbonized, the combustables are eliminated, except for fly ash, and bulk density increases markedly to between about 35 and 70 lbs./cu. ft. The residue is hard and glass like in nature and an ideal inorganic heat transfer solid which is readily generated from within the process itself. The inorganic heat transfer solid has a sintering temperature between about 1425° and about 1700° F., a fusion temperature from about 2000° to about 2300° F., and a particle and skeletal density of about 150 lbs./cu. ft. and may be termed "ash".

Bulk density will vary with carbon content as is shown in Table 2.

Table 2

| % Carbon in Inorganic Solid Heat Source | Fluidized Bulk Density lb./ft$^3$ | Mean Particle Size of Mixture, Micron |
| --- | --- | --- |
| 36 | 3 | 40 |
| 51 | 7 | 50 |
| 5.7 | 35 | 100 |
| 2.9 | 38.5 | 120 |
| 0.6 | 38 | 130 |

A comparable comparison is shown in attached FIG. 1 which compares two inorganic fractions of different carbon content for fluid bed density as a function of particle size. Fluid bed density is given in pounds mass per cubic foot (lb$_M$/ft$^3$). From these considerations, it is evident that bulk density is maximized at minimum carbon content. An inorganic solid heat source having less than about 10% by weight carbon is particularly preferred as exhibiting maximum bulk density and fluidized density.

The pyrolytic oils formed, while varying in nature depending upon the composition of the waste material processed and pyrolysis conditions employed, are at the same time unique. They may be characterized as oxygenated, complex organic fluid, typically up to 40% and in some cases up to 85% soluble in water, acids or base. Solubility in polar organic solvents such as glycerol is limited and the pyrolytic oils are relatively insoluble in nonpolar organic solvents, such as diesel oil, carbon tetrachloride, pentane, decane, benzene, toluene and hexane. The pyrolysis oil, however, can be blended and mixed with various #6 fuel oils. Combustion stability of the mixture is about the same as #6 fuel oil alone.

A typical example of an elemental analysis of the pyrolytic oil is that obtained from the pyrolysis of a waste material containing about 70% cellulosics. The oil thus obtained will contain from about 52 to about 60% carbon, from about 6 to about 8% hydrogen, from about 1 to about 2% nitrogen and from about 29 to about 33% oxygen. The empirical formula which best fits the pyrolytic oil analysis is $C_5H_8O_2$. Specific gravities are unusually high, ranging from about 1.1 to about 1.4.

Figure 2:
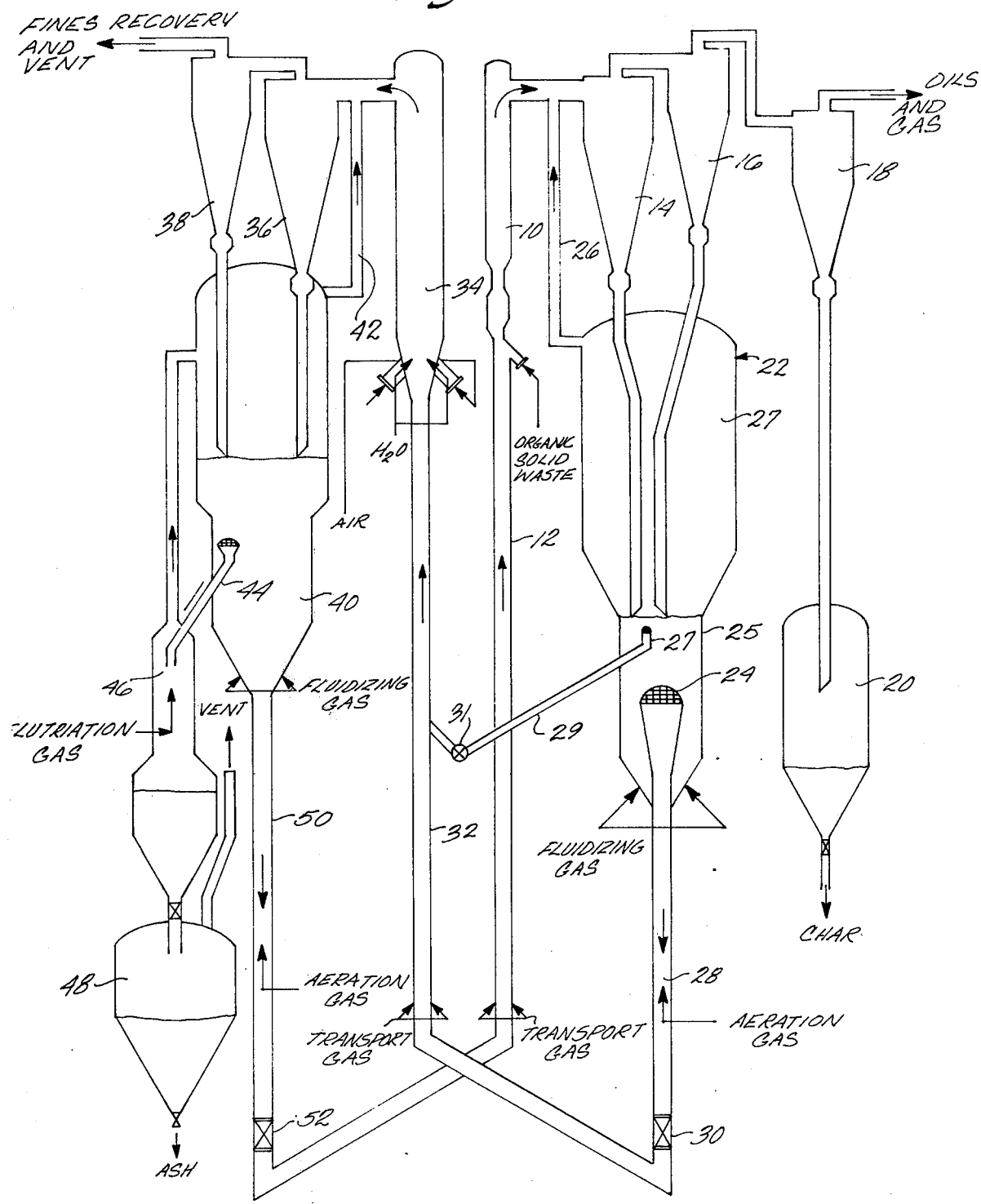
FIG. 2 illustrates apparatus which may be used to carry out the practice of the instant invention.
Figure 3:
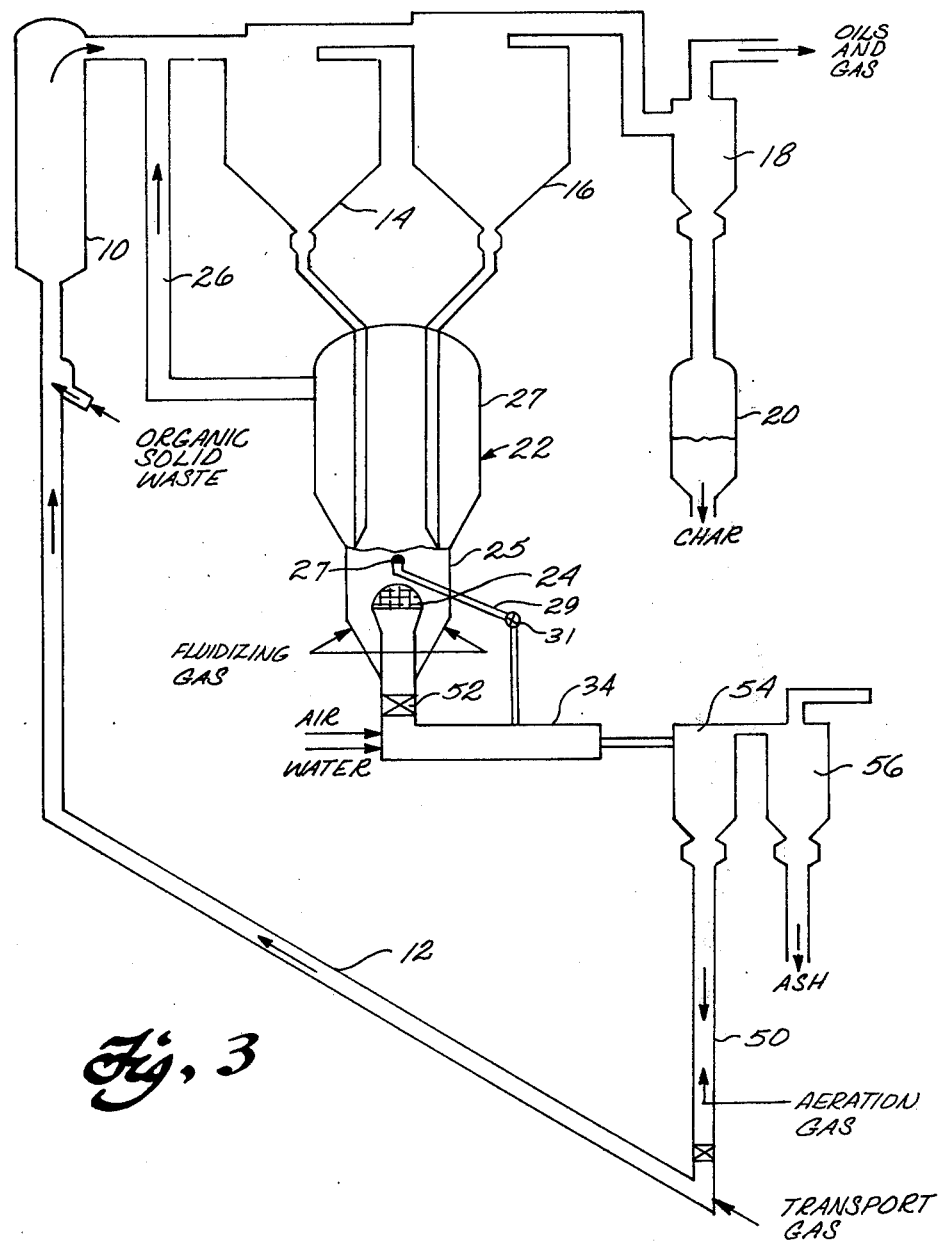
FIG. 3 illustrates another apparatus which may be used to carry out the practice of the instant invention.

The process of this invention may be best understood with reference to attached FIGS. 2 and 3.

With reference to FIG. 2, the organic solid waste after gross separation of inorganics, is comminuted to a size in which the maximum particle dimension is less than 1 inch, preferably to a size less than about 5 mesh, more preferably less than about 8 mesh, and dried to make it transportable as a fluidized mass. The dried organic solid waste is transported, using a carrier gas, typically product gas from the process, to pyrolysis reactor 10, where it is combined with fluidized solid inorganic heat source resulting from decarbonization of char, fed in vertical riser 12. Pyrolysis occurs in flash transport pyrolysis reactor 10 within a temperature range from about 600° F. to some temperature below the sintering temperature of the solid inorganic heat source, preferably, from about 600° to about 1700° F., more preferably from about 800° to about 1400° F. Flow conditions are turbulent with Reynolds numbers being in excess of 2000, and more typically in the order of 50,000 or more.

Typical feed to the pyrolysis reactor 10 consists of about 2 to about 20 pounds of the solid inorganic heat source per pound of organic solid waste depending on pyrolysis temperature. The preferred range is from about 4 to about 6 pounds of solid inorganic heat source per pound of organic solid waste.

The carrier gas employed to transport the solid inorganic heat source and the comminuted organic solid waste to the pyrolysis reactor 10 is one which will not deleteriously react with the products of pyrolysis. The gas stream may, however, contain reactive constituents such as carbon monoxide which will react with the hydrocarbons to form other useful products. Oxygen is to be avoided. While a totally inert carrier gas such as nitrogen can be used, the preferred gas is the gas stream formed from pyrolysis.

Typically, the amount of the gas employed is only sufficient to transport the solid inorganic heat source and the organic solid waste as a fluidized mass to the pyrolysis reactor 10. Generally, a solids to gas weight ratio of about 1 to about 4 is employed. All that is critical is the maintenance of turbulent flow conditions and free solids transport. Residence time in the pyrolysis zone is short and less than 1 minute, preferably from about 0.1 to about 2 seconds and more typically from about 0.2 to about 0.5 second.

Essentially all of the heat required for pyrolysis is provided by the solid inorganic heat source and transferred to the organic solid waste by solids to solids contact as well as solids to gas to solids heat transfer. Velocities range from about 10 to about 200 ft./sec.

The effluent from the pyrolysis reactor 10 is composed of the solid inorganic heat source, the solid carbon containing product of pyrolysis, a condensable pyrolytic oil, water as steam, and the normally gaseous constituents. The effluent passes from the pyrolysis reactor 10 to high efficiency product cyclones 14 and 16. Cyclone 14 serves primarily to separate the solid inorganic heat source and larger particles of the carbon containing solid residue of pyrolysis from the pyrolysis reactor effluent whereas cyclone 16 separates intermediate to fine particles of the carbon containing solid residue of pyrolysis and finer solid inorganic heat source particles. The balance of the fine carbon containing solid residue of pyrolysis, as product, is separated in fines cyclone 18 for collection in hopper 20. The gas and condensable pyrolytic oils are passed to recovery zones, not shown. The inorganic heat source and carbon containing solid residue of pyrolysis collect in stripper 22 which is maintained in a fluidized state by the upward flow of product gas as an aeration gas. Stripper 22 contains a screen 24 to reject clinkers which gravitate toward the base of the stripper and by mechanical action are eventually recovered from the system.

More importantly, the fluidization gas removes pyrolytic oils from the particles and by its central position in a constricted zone 25 tends to sample particles of average composition in stripper 22. Other locations would tend to sample predominately the inorganic heat source or carbon containing solid residue of pyrolysis. However, for the contingency that the carbon containing solid residue of pyrolysis formed is fine and will not blend well with the inorganic heat source so as to make it fuel lean, there is provided a secondary withdrawal tube 27 cooperating with feed line 29 and valve 31 to remove fine particles of the carbon containing solid residue of pyrolysis along with inorganic heat source from stripper 22 for feed to burner 34.

The expanded section of the stripper enables the majority of particles exited by the aeration gas to return to the mass. Bypass 26 releases the fluidization gas from stripper 22 carrying with it any fines entrained in the gas space above the collected particles.

The cold solid inorganic heat source and carbon containing solid residue of pyrolysis maintained in a semifluidized state by the use of product gas as as aeration gas enter fluidized leg or standpipe 28, passes through slide valve 30, and are transported along riser 32 to burner 34. The gas employed for transport is preferably air.

Air is fed to burner 34 in proportions to combust at least 80%, preferably 100%, of the carbon contained in the carbon containing solid residue of pyrolysis. Heat of combustion serves to preheat the cold solid inorganic heat source to a suitable temperature for return to pyrolysis reactor 10 and generates from the carbon containing solid residue of pyrolysis additional solid inorganic heat source. To control the temperature and prevent agglomeration or sintering of solid inorganic heat source, water is introduced whith the air as a uniform fog. The use of a fog as opposed to a spray prevents localized quenching and makes water more available for reaction with carbon. Residence time in burner 30 is sufficient for the desired degree of combustion to occur and typically from 0.4 to 3 seconds, preferably 0.5 to 1 second. Typical temperatures range from about 1250° to about 1650° F.

The flue gas and particulate solid inorganic heat source leave burner 34 and pass through low efficiency heater cyclones 36 and 38 which recover particles in the particle size range from 10 to 2000 microns, preferably from 20 to about 600 microns. Some fly ash and fines are collected downstream to yield high temperature flue gas, which after use of its sensible heat in the overall process is vented. The recovered solid inorganic heat source collects in surge hopper 40 maintained, by insulation, at a temperature about equal to the temperature in burner 34. By-pass 42 is provided to return fines entrained in the fluidizing gas entering surge hopper 40 back to cyclone 36. If combustion in char burner 34 is incomplete, the decarbonization is completed, i.e. to reduce carbon content to 10% or less, in surge hopper 40 by introduction of air as the aeration or fluidizing gas and water to control temperature.

The particles of the solid inorganic heat source which collect in surge hopper 40 may vary in particle size from about 2000 microns or more, to less than 10 microns. To insure return of particles of a desired size range to reactor 10 requires continuous or intermittent adjustments in particle size.

To enable adjustment of particle size in hopper 40, there is employed an auxiliary operation keyed to excess solid inorganic heat source recovery.

The solid inorganic heat source is generated in a quantity in excess of that required for recycle and is withdrawn through siphon tube 44, passed to quench hopper 46 and finally to product hopper 48.

If the circulating particles tend to become too fine, the bed level in surge hopper 40 is allowed to rise to increase entrainment of the fines by cyclones 36 and 38 to concentrate the larger particles in surge hopper 40. As an alternative, a small amount of gas can be injected into the bottom of cyclone 38 to disturb its operation to minimize recovery of fine particles.

Conversely, if the particles become too coarse, the product inorganics contained in surge hopper 40 is withdrawn by screened siphon tube 44 at a large rate and elutriated to return fines of surge hopper 40. This concentrates the fine particles in surge hopper 40 and reduces average particle size of about 50 microns. Excess inorganics are continuously withdrawn as product. This control leads to the preferred operation wherein the inorganic heat source contains less than 50% fly ash, the retained fly ash having a particle size greater than about 10 microns. As a whole, the inorganic solid source of heat has a particle size distribution in which at least 50% of the solids have a particle size greater than about 37 microns (400 mesh).

The fluidized solid inorganic heat source required for pyrolysis is passed by aerated leg or standpipe 50 through slide valve 52 and entrained by transport gas, preferably the product gas, and passed through riser 12 to pyrolysis reactor 10 to complete the loop cycle.

In the operation of the apparatus depicted in FIG. 1, the standpipes 28 and 50 form fluidized legs where the particles are retained at a reduced bulk density, generally 70% of settled bulk density. To achieve the proper base leg pressure in excess of operating pressures in pyrolysis reactor 10 and char burner 34 and to prevent backflow of materials, requires a leg of a height determined by the pressures required and the density of its fluidized solids. This is most critical in leg 50. As a consequence of using the decarbonized solid residue of pyrolysis as compared to the carbon containing solid residue itself as the heat source, leg height can effectively be reduced. The reduction in height is critical for some installations to meet code restrictions for chemical complexes. There is also a significant reduction in plant cost because of the savings in supports for the leg and the vessels above it. Nominally, leg pressures at the valves are about 1.5 to 2.5 times the operating pressure of the reactor or burner served by the leg.

The use of the solid inorganic heat source is more reliable in the control of particle size than carbon containing solid residue of pyrolysis. The latter is readily subject to attrition, breaking down into particles of fine size, contaminating the pyrolytic oil and gas streams. The solid inorganic source as obtained by substantial decarbonization of the carbon containing solid product of pyrolysis by contrast, is relatively attrition free, subject to precise control over the range of particle size employed in the pyrolysis reactor, simplifying greatly the overall operation.

In addition, since essentially complete combustion of char may occur in char burner 34, the carbon monoxide content of the gas stream can be effectively controlled.

FIG. 3 represents an alternative to the process depicted in FIG. 2.

With reference to FIG. 3, again the organic solid waste is transported by carrier gas and combined with the inorganic solid heat source and the transport gas in transport pyrolysis reactor 10. After pyrolysis, the products are passed through high efficiency product cyclones 14 and 16 for recovery of spent solid inorganic heat source and the carbon containing solid product of pyrolysis. The fines are separated in cyclone 18 for storage in hopper 20. By-pass 26, as is previously described, permits the fines entrained in stripper 22 to be returned to the product line.

In this instance, to avoid the leg 28, the particulate mixture is fed by low temperature rotary valve 52 to burner 34 where the carbon containing solid residue of pyrolysis is decarbonized for passage to low efficiency cyclone 54 where the solid inorganic heat source in the particle size of from about 10 to about 2000 microns, preferably from 20 to about 100 microns is recovered for return to the pyrolysis reactor using leg 50 and riser or feed line 12. The fine inorganic particles or fly ash are recovered in cyclone 56, and the flue gas after recovery of sensible heat vented to the atmosphere.

In carrying out the process of this invention, it will be appreciated that since the solid inorganic heat source is not available for start up conditions, another source of heat is required. This may conveniently take the form of fine glass comminuted within the process or sand. The starting material, however, once the process is in operation, will eventually be supplanted in the lines by the solid inorganic heat source formed by decarbonization of the carbon containing solid residue of pyrolysis.

It will also be appreciated that where it is desired to upgrade the quality of the pyrolytic oil or heat value of the product gas from the pyrolysis operation, there may be included in the transport gas reactive constituents or heat supplement constituents which react with the pyrolytic oil in the product oil and/or gas.

As indicated, however, the constituents must not deleteriously react with the products of pyrolysis, but are added to upgrade their value.

With reference again to FIGS. 4, 5 and 6, the nature of the carbon containing solid residue of pyrolysis is a heterogenous mixture of particulate inorganics from an origin different from the organics which underwent pyrolysis and carbonaceous particles resulting from pyrolysis. To at least a substantial degree the inorganics are unchanged by pyrolysis. The organics in addition to formation of the pyrolytic products may release otherwise nonseparable, homogeneously contained inorganic filters such as clays and the like. These fine particles appear as fly ash (see FIG. 6) and to a major extent are removed from the system following combustion or decarbonization. During decarbonization, the combustables are substantially eliminated essentially leaving only the inorganics which were contained in the organic waste portion or released as a consequence of pyrolysis or combustion. It is the inorganics which remain which serve as the inorganic solid heat source of this invention. It is because of the required presence of the inorganics, that the carbon containing solid residue of pyrolysis differs from char as it is understood in the normal sense. It is through the presence of inorganics that a heat source superior to char can be generated from the organic wastes processed.

Once prepared for recycle as the heat source, a prefered specification, the fly ash content be less than about 50% by weight, and then the retained fly ash have a particle size greater than 10 microns. Moreover, the inorganic solid source of heat should have a particle size distribution in which at least 50% of the particles are of a size greater than 37 microns.

While nouise limiting, the following example is illustrative of the practice of the process of this invention.

EXAMPLE

Organic solid waste resulting from the treatment of municipal solid waste to remove the inorganic constituents is dried and comminuted to a particle size less than 8 mesh. The organic solid waste having the composition shown in Table 3 is fed at a rate of 9491.4 pounds per hour to a pyrolysis reactor using as the carrier gas a product gas of the composition shown in Table 4.

Table 3

| Component | Wt. % |
| --- | --- |
| Organics | 92.29 |
| Metals | 0.38 |
| Glass | 1.69 |
| Inorganics | 1.40 |
| Other Solids | 0.62 |
| Water | 3.62 |

Table 4

| Carrier Gas Composition | Vol. % |
| --- | --- |
| $H_2S$ | 0.31 |
| $N_2$ | 0.86 |
| $CO_2$ | 32.42 |
| CO | 31.13 |
| $H_2$ | 10.54 |
| $CH_4$ | 5.13 |
| $C_2H_4$ | 2.56 |
| $C_2H_6$ | 0.88 |
| $C_3$ | 0.88 |
| $H_2O$ | 15.28 |
| Total | 100.00 |
| Ave. M.W. | 28.43 |

The carrier gas has a temperature of 500° F. and the organic solids waste to carrier gas weight ratio is 2.0. The nominal solids temperature is 100° F.

Simultaneously, 49,831 pounds per hour of a particulate solid inorganic heat source formed from decarbonization of the carbon containing solid residue of pyrolysis is transported along by about 480 pounds per hour of the carrier gas to the pyrolysis reactor. Heat source temperature is about 1350° F. The average exit temperature in the pyrolysis reactor is 950° F. Operating pressure is 10.5 psig. Average residence time is 0.6 second.

After pyrolysis, the discharge composition from reactor 10 is 12,883.6 pounds per hour of gas including 3,659 pounds per hour of pyrolytic oil, 1,760.5 pounds per hour water, 1,829.5 pounds of the carbon containing solid residue of pyrolysis, and the total inorganic solid heat source fed to the pyrolysis reactor. The effluent is passed to a first product cyclone which separates 51,120 pounds per hour of solids from the gas stream and a second cyclone which separates 269 pounds per hour of solids from the gas stream. The balance of the gas stream advances to fine cyclone which separates 207 pounds per hour of essentially fine carbon containing solid residue of pyrolysis, as product from the gas stream. After quench separation of pyrolytic oil, residual gas stream at a rate of 13,419 pounds per hour is made available as a heating gas and gas for the process. The excess is flared to the atmosphere. The composition of the pyrolytic oil and carbon containing solid residue of pryolysis is shown in Table 5.

Table 5

| Dry Pyrolytic Product Compositions (wt. %) | | |
| --- | --- | --- |
| | Carbon Containing Solid Residue of Pyrolysis | Oil |
| Carbon | 48.8 | 57.0 |
| Hydrogen | 3.3 | 7.7 |
| Nitrogen | 1.1 | 1.1 |
| Sulfur | 0.2 | 0.2 |
| Chlorine | 0.3 | 0.2 |
| Ash | 33.0 | 0.2 |
| Oxygen | 13.3 | 33.6 |

The physical properties and particle size distribution of the inorganic source and carbon containing solid residue of pyrolysis fed to the product cyclones is shown in Table 6.

Of the mixture of solid inorganic heat source and carbon containing solid residue of pyrolysis collected in the stripper, particulate solids are removed at a rate of 51,388 pounds per hour, using as the prime transport gas air, and fed to the burner 30. Air at the rate of 2,328 standard cubic feet per minute, and water at the rate of 100 standard cubic feet per minute, as a quench, are combined with the solids in burner 30. Decarbonization of the carbon containing solid residue of pyrolysis by oxidation occurs at an average burner temperature of 1350° F. The resultant solid inorganic heat source and gases are passed to a first burner cyclone which separates solids at the rate of 49,914 pounds per hour and then to a second burner cyclone which receives solids at the rate of 306 pounds per hour. Residual gas stream containing 120 pounds per hour of fines is passed to a fines accumulator. The solid inorganic heat source collected in the storage hopper is withdrawn as product at a net recovery rate of 84 pounds per hour. In this operation, the flue gas from burner 30 is employed to preheat the air required for combustion. In this instance, the air is heated to a temperature of 650° F. by indirect heat exchange with flue gas following in which the flue gas is vented to the atmosphere. In the operation, nominal residence time in the pyrolysis reactor is 0.3 second, and in char burner 0.6 second. Average residence time of solids in stripper 22 is 3 minutes and the surge hopper 40, 5.5 minutes.

The physical properties and particle size of the solids leaving the pyrolysis reactor are shown in Table 6. About 99.96% of the particles are removed. The inorganic heat source composition is that fed to the pyrolysis reactor.

Table 6

| | Inorganic Solid Heat Source | Carbon Containing Solid Residue of Pyrolysis |
| --- | --- | --- |
| Composition, wt. % | 96.5 | 3.5 |
| Particle density, lbs/ft$^3$ | 150.0 | 112.0 |
| Skeletal density, lbs/ft$^3$ | 150.0 | 150.0 |
| Settled bulk density, lbs/ft$^3$ | 58 | 12.5 |
| Size Distribution, wt. % | | |
| 0 ~ 10 microns | 1.2 | 34.0 |
| 10 ~ 20 | 7.8 | 24.0 |
| 20 ~ 40 | 13.0 | 19.0 |
| 40 ~ 80 | 16.0 | 10.0 |
| 80 ~ 120 | 18.0 | 4.0 |
| 120 ~ 160 | 13.0 | 2.0 |
| 160 ~ 200 | 10.0 | 1.5 |
| 200 ~ 400 | 15.0 | 2.5 |
| 400 ~ 600 | 2.5 | 1.2 |
| 600 ~ 1000 | 2.0 | 1.1 |
| 1000 ~ 2000 | 1.5 | 0.7 |
| 2000 + | 0.0 | 0.0 |

What is claimed is:

1. In a process for the treatment of solid waste in which a waste solid is separated into an organic fraction and solid organic solid waste fraction containing entrained particulate inorganic constituents and in which after comminution and drying the organic solid is pyrolyzed to form a carbon containing solid residue of pyrolysis, a condensable pyrolytic oil and gas, the improvement which comprises:
   (a) combining and transporting the dried comminuted organic solid waste fraction, including the particulate inorganics, which fraction is of a particle size in which the largest particle dimension is less than one inch, a carrier gas which is nondeleteriously reactive with the pyrolysis products, and a hot particulate inorganic solid heat source formed from decarbonization of the carbon containing solid residue of pyrolysis and having a bulk density from about 35 to about 70 lbs./cu. ft. as the prime source of heat for pyrolysis under transport turbulent flow conditions through a pyrolysis zone maintained at a temperature from about 600° F. to less than the sintering temperature of the inorganic solid heat source for a time sufficient to form from the organic solid waste the carbon containing solid residue and condensable pyrolytic oils and gases;
   (b) separating the carbon containing solid residue of pyrolysis in admixture with the inorganic solid heat source from the condensable pyrolytic oils and gases;
   (c) decarbonizing at least a portion of the carbon containing solid residue of pyrolysis to form additional hot inorganic solid heat source, the decarbonization of the carbon containing solid residue of pyrolysis occurring at a temperature below the fusion temperature of the resultant inorganic solid heat source;
   (d) recycling at least a portion of the formed hot inorganic solid source of heat to the pyrolysis zone.

2. The process of claim 1 in which pyrolysis is conducted at a temperature from about 600° to about 1700° F.

3. The process of claim 1 in which pyrolysis is conducted at a temperature from about 800° to about 1400° F.

4. The process of claim 1 in which the particle size of the inorganic solid heat source is from about 10 to about 2000 microns.

5. The process of claim 1 in which the particle size of the inorganic solid heat source is from about 20 to about 1000 microns.

6. The process of claim 3 in which the particle size of the inorganic solid heat source is from about 20 to about 2000 microns.

7. The process of claim 3 in which the particle size of the inorganic solid heat source is from about 20 to about 1000 microns.

8. The process of claim 1 in which the carbon containing solid residue of pyrolysis is decarbonized by high temperature oxidation in the presence of a source of oxygen at a temperature below the fusion temperature of the inorganic solid heat source, the temperature being controlled by the introduction of water.

9. The process of claim 8 in the source of oxygen is air.

10. The process of claim 8 in which oxygen is present in an amount sufficient to oxidize at least 80% of the carbon contained in the carbon containing solid residue of pyrolysis.

11. The process of claim 3 in which the carbon containing solid residue of pyrolysis is decarbonized by high temperature oxidation in the presence of a source of oxygen at a temperature below the fusion temperature of the inorganic solid source, the temperature being controlled by the introduction of water.

12. The process of claim 11 in which the source of oxygen is air.

13. The process of claim 11 in which oxygen is present in an amount sufficient to oxidize at least 80% of the carbon contained in the carbon containing solid residue of pyrolysis.

14. The process of claim 1 in which the weight ratio of inorganic solid heat source to organic solid waste is from about 2 to 1 to about 20 to 1.

15. The process of claim 3 in which the weight ratio of inorganic solid heat source to organic solid waste is from about 2 to 1 to about 20 to 1.

16. The process of claim 1 in which the weight ratio of inorganic solid heat source to organic solid waste is from about 4 to 1 to about 6 to 1.

17. The process of claim 3 in which the weight ratio of inorganic solid heat source to organic solid waste is from about 4 to 1 to about 6 to 1.

18. The process of claim 1 in which solids residence time in the pyrolysis zone is from 0.1 to about 2 seconds.

19. The process of claim 1 in which solids residence time in the pyrolysis zone is from about 0.2 to about 0.5 seconds.

20. The process of claim 3 in which solids residence time in the pyrolysis zone is from 0.1 to about 2 seconds.

21. The process of claim 3 in which solids residence time in the pyrolysis zone is from about 0.2 to about 0.5 seconds.

22. The process of claim 1 in which the organic solid waste is of a particle size less than 8 mesh.

23. The process of claim 1 in which the organic solid waste is of a particle size less than 5 mesh.

* * * * *